United States Patent [19]

Webb

[11] Patent Number: 4,774,665

[45] Date of Patent: Sep. 27, 1988

[54] ELECTRONIC COMPUTERIZED VOTE-COUNTING APPARATUS

[75] Inventor: Kenneth D. Webb, Ventura, Calif.

[73] Assignee: Data Information Management Systems, Inc., Ventura, Calif.

[21] Appl. No.: 855,758

[22] Filed: Apr. 24, 1986

[51] Int. Cl.$^4$ ........................ G06F 15/20; G07C 13/00

[52] U.S. Cl. .................................... 364/409; 235/54 F

[58] Field of Search ............... 364/409, 400; 235/54 F

[56] References Cited

U.S. PATENT DOCUMENTS

| | | | |
|---|---|---|---|
| 3,944,788 | 3/1976 | Cemisar et al. | 235/54 F |
| 4,015,106 | 3/1977 | DePhillipo | 235/54 F |
| 4,021,780 | 5/1977 | Narey et al. | 235/54 F |
| 4,227,643 | 10/1980 | Luther | 235/54 F |
| 4,300,123 | 11/1981 | McMillis et al. | 235/456 X |
| 4,357,596 | 11/1982 | Feilchenfeld | 235/456 X |
| 4,641,240 | 2/1987 | Boram | 235/54 F |
| 4,641,241 | 2/1987 | Boram | 235/54 F |

*Primary Examiner*—Joseph Ruggiero
*Assistant Examiner*—Charles B. Meyer
*Attorney, Agent, or Firm*—Drucker & Sommers

[57] ABSTRACT

An apparatus for enables electronic computerized counting of votes cast by voters in an election. The apparatus is adapted to enable electronic computerized recording, counting, and storing of votes cast by voters on ballot cards at precinct polling places remote from a central district office without exposing the ballot card to any person other than the voter. It is further adapted to enable electronic computerized programming and testing of the election at large, control of the introduction of the election into individual precinct formats, and reading, aggregating, and tallying of the stored precinct counts for delivering the results of the election. The apparatus includes a plurality of electronic computerized precinct workstations, each adapted to read, count, and store the votes cast at a precinct polling place, powered by a self-contained battery. The apparatus further includes an electronic computerized central district workstation, adapted to program and test the election, control programming of the individual precinct formats, and read, aggregate, and tally the stored precinct vote counts for generating the election results.

34 Claims, 3 Drawing Sheets

Fig. 1
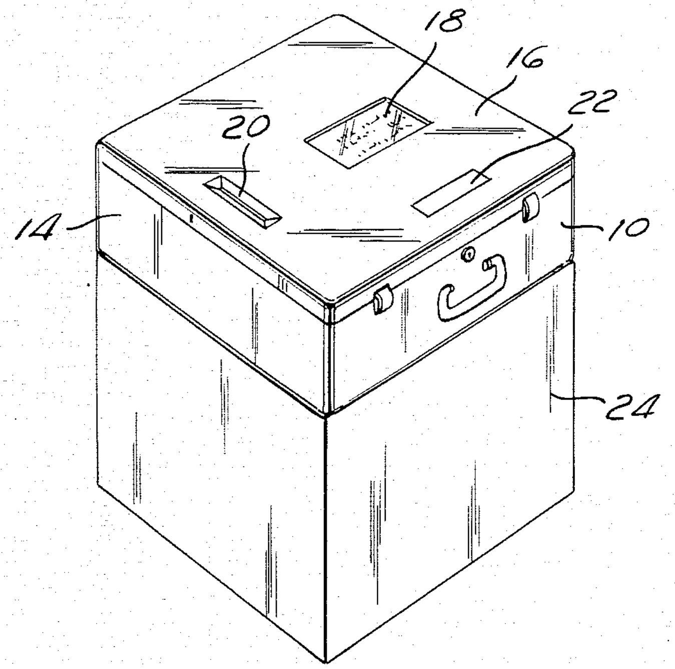
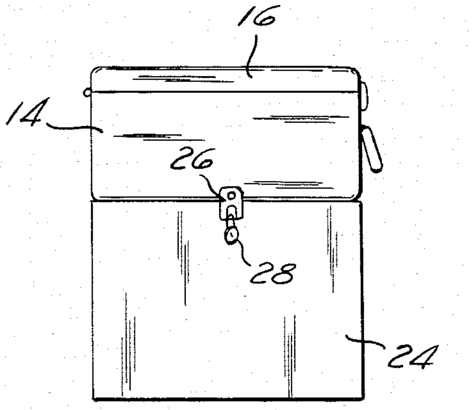
Fig. 2
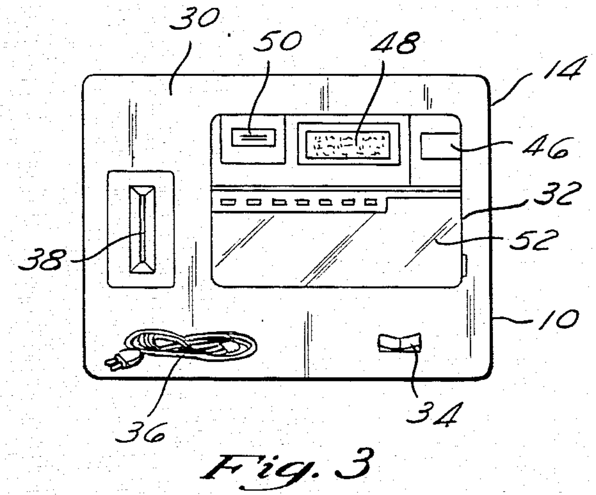
Fig. 3
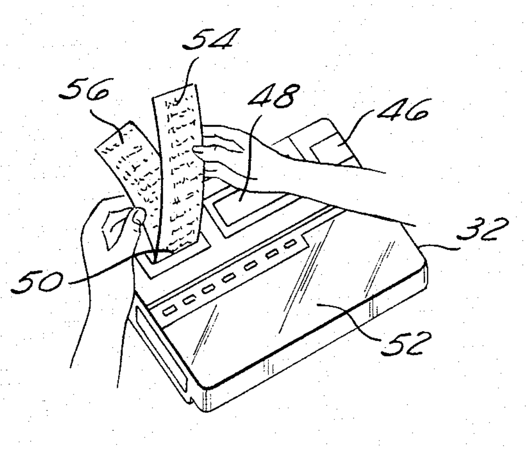
Fig. 4

ELECTRONIC COMPUTERIZED VOTE-COUNTING APPARATUS

BACKGROUND OF THE INVENTION

The invention relates generally to apparatuses for enabling the counting of votes in an election. It relates specifically to such an apparatus adapted to enable electronic computerized programming, testing, formating, counting, storing, reading, aggregating and delivery of the results of votes recorded by voters on ballot cards, without exposing the ballot card to any person other than the voter.

The prior art includes devices, at a central station in an election district, for electronically counting and delivering the results of votes cast on ballot cards at polling places in election precincts remote from the central station, upon bringing sealed ballot boxes, in which the ballot cards are inserted by the voters, from such remote stations back to the central station.

Such devices are adapted for use in a number of states which permit ballots to be transported uncounted from the remote precinct polling places back to the central station for counting. However, a large number of states which use ballot cards in elections require that the votes recorded on such ballot cards be counted at the remote precinct polling places, with the results of such vote counts to then be delivered to a central station, as by a telephone report thereon, at which central station all such votes are then tallied to provide the results of the election. Such requirement for on-site counting is generally based on an effort to maintain the secrecy of the ballots and reduce the opportunities for tampering with the ballots in any manner, and to enable ready identification of the persons responsible for the ballots, for investigation and interrogation in the event of any voting irregularities.

However, in those states which require on-site vote counting at remote precinct polling places, the sealed ballot box in which the ballot cards are inserted by the voters must be unsealed at such remote site to enable counting of such ballots. This procedure eliminates the secrecy of the ballots and provides an opportunity for tampering with the ballots, outside of the direct control of supervisory personnel at the central station. Further, there are no supervisory controls to insure that the election is conducted pursuant to the agreement of all persons responsible for the conduct of the election at each such remote precinct polling place. Still further, the counting of the votes on the ballot cards isper-formed manually, a very time-consuming, error-prone, non-secret, and non-secure process. The telephoning-in of the results of the vote is likewise an error-prone, non-secret, and non-secure method of transmitting same.

SUMMARY OF THE INVENTION

The invention is adapted to overcome the above problems, as well as others, associated with the prior art. It provides an efficient and effective apparatus for enabling electronic computerized reading and counting of votes cast by voters on ballot cards, at precinct polling places, located remote from a central station in the election district where such vote counts are tallied, for each office or issue being voted on in the election without exposing such ballot cards to any person. It further provides such an apparatus for enabling electronic computerized programming and testing of the election at large, controlling of the introduction of the election into individual precinct formats, and reading, aggregating, and tallying of the stored precinct vote counts at the central station in the election district, for enabling delivery of the results of the election for such district regarding each office or issue being voted on in the election.

The apparatus includes a plurality of programmable electronic vote-counting devices, each adapted to count the votes recorded by voters on ballot cards at the precinct polling place remote from the central station, and to store such vote count, for each separate office or issue being voted on in such election. Each such electronic vote-counting device is adapted to be connected to a ballot box such that the ballot card, after the voter records the votes therein, is inserted by the voter into the device and, after processing by the device, is ejected from the device into the ballot box to which the device is connected, for storage of the read and counted ballot card therein in complete secrecy and security.

The apparatus further includes a programmable electronic vote-count reading device, adapted to enable electronic computerized programming and testing of the election at large, controlling of the introduction of the election into individual precinct formats, reading, aggregating, and tallying of the vote-count stored in each of the electronic vote-counting devices, and delivering the results of the election, for each office or issue voted upon, at the central station of the election district.

To set up the apparatus for use in a particular election, the central station vote-count reading device is programmed for the offices and/or issues being voted on in each precinct. The central station device is then used to program and test the election at large, and control the introduction of the election into individual precinct formats programmed in individual precinct EPROM cartridges, adapted for use in each precinct vote-counting device, with the offices and/or issues being voted on in each such precinct. Each EPROM cartridge is then placed in a precinct vote-counting device, each such device being connected to a sealed ballot box. Each precinct vote-counting device and ballot box is then transported to the precinct polling place. Each is powered by a self-contained battery pack.

On election day, each precinct vote-counting device is initialized, ballot cards are inserted therein by voters after recording their votes on such cards, the cards are read internally in the device and the votes for each office and/or issue are counted and stored and the ballot cards are stored in the sealed ballot box. When the election is over, the device is shut down, and then transported back to the central station, where the stored vote counts are read, aggregated, and tallied, and the results of the election are delivered by the central station vote-count reading device for each office and/or issue voted upon.

The above features of the device enable reading, counting, and storing of votes recorded by voters on ballot cards at a precinct polling place, and storing of the ballot cards on which such votes are recorded, in a secret, secure, efficient and efective manner, without opportunity for disclosure thereof or tampering therewith. Such features further provide programming, testing, formating of the election, reading and tallying of the stored vote counts at a central station, and delivering the results of the election in a secure, efficient and effective manner.

DESCRIPTION OF THE DRAWINGS

FIG. 1 is a perspective view of a precinct vote-counting device, connected to a ballot box, pursuant to the invention;

FIG. 2 is a side elevational view of the precinct vote-counting device connected to the ballot box, pursuant to the invention;

FIG. 3 is a top plan view of the precinct vote-counting device, with the housing lid open;

FIG. 4 is a perspective view of the computer in the precinct vote-counting device, with the line printer therein printing out data in duplicate on separable sheets of paper;

DETAILED DESCRIPTION OF THE INVENTION

Figure 5:
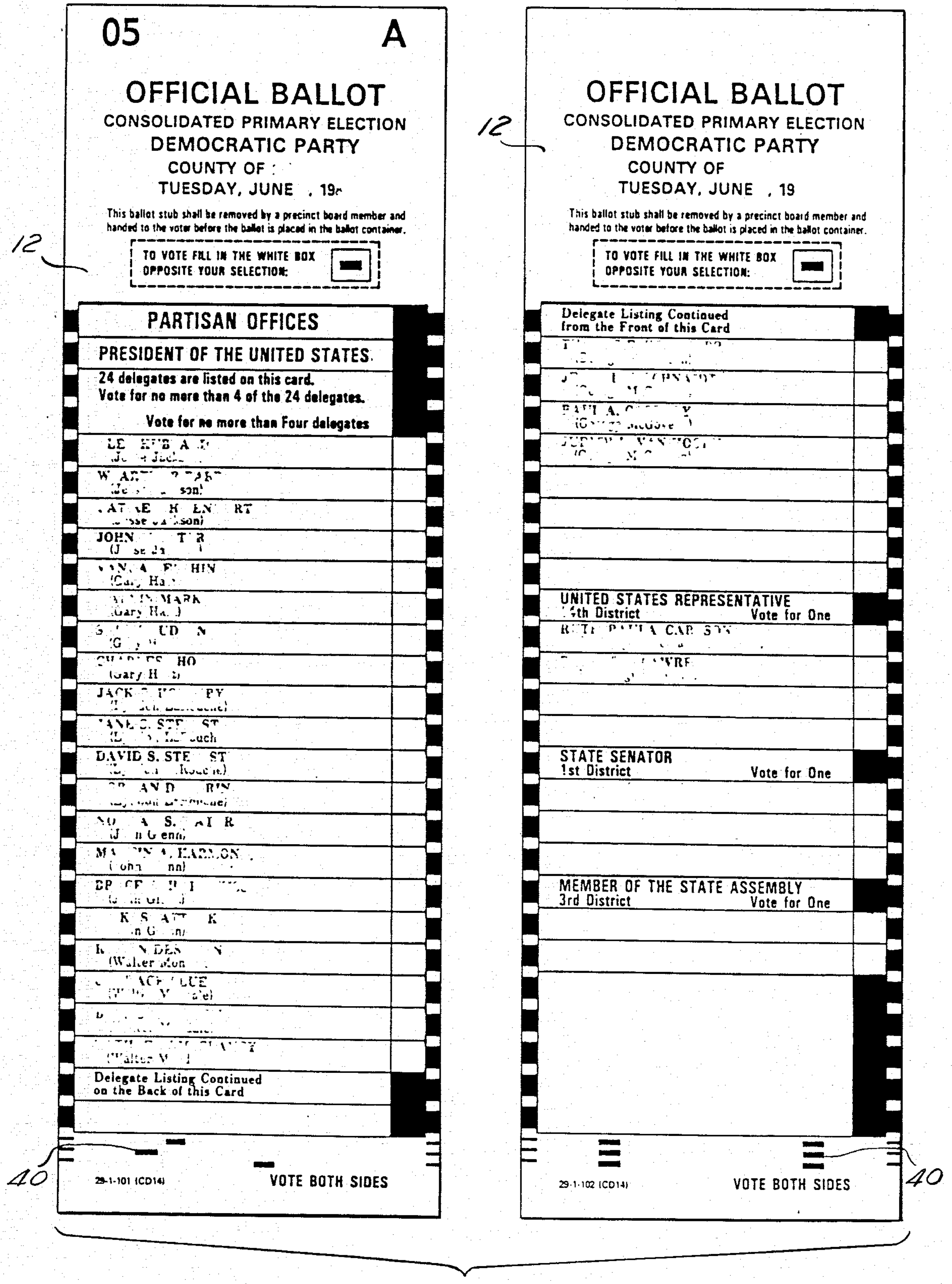
FIG. 5 is an elevational view of the front and back of a sample ballot card used with the precinct ballot-counting device.

The invention, as shown in FIGS. 1–8, and as described herein, comprises an apparatus for enabling electronic computerized reading and counting of votes during an election, at a plurality of remote elections precinct stations, in polling places where votes are recorded by voters on ballot cards without exposing the ballot cards, to persons other than the voter. The apparatus further enables electronic computerized programming and testing of the election at large, controlling of the introduction of the election into individual precinct formats, reading, aggregating, and tallying of the stored precinct vote counts after the election, and delivery of the results of the election at a central election department station.

The apparatus includes a plurality of precinct workstations, as 10, each adapted to be located at precinct polling places remote from the central elections department office, and to receive ballot cards, as 12, on which voters have recorded their votes, as by marking in a white box opposite the voter's selection for each office and/or issue being voted on in the election, as shown in FIGS. 1–5. It is further adapted to read the recorded votes from the ballot cards, as 12, and to tally each vote with the selected candidate and/or issue position, regardless of the orientation of the ballot card upon insertion into the station, as 10. It is still further adapted to count the votes and store such count therein.

The apparatus further includes a district workstation (not shown), located at the central elections department district office, adapted to program and test the election at large, to control the introduction of the election into individual precinct programs for conducting the election at each precinct, to read, aggregate, and tally the stored vote counts from each precinct workstation, after completion of the election, and to deliver the results of the election for each office and/or issue being voted on.

Each precinct workstation, as 10, includes a housing 14, including an openable lid 16. Lid 16 includes a window 18, for viewing a display screen therethrough, a slot 20, through which a ballot card, as 12, is inserted, and a label 22, which may be applied thereto to identify the particular precinct polling place where station 10 is to be located, as shown in FIG. 1. Further each station 10 is adapted to be connected to a ballot box, as 24, by connectors, as 26, and sealed to ballot box 24, as by seal 28, as shown in FIGS. 1 and 2. Ballot box 24 includes a ballot card receiving slot (not shown).

Contained in each housing, as 14, are a ballot card reader 30, a programmable station computer 32, a power switch 34, and a connecting cable 36, as shown in FIG. 3.

Reader 30 includes slots, as 38 on top, at both the top and bottom thereof, with a continuous channel therethrough from one slot the the other, through which slots and channel each ballot card, as 12, travels. Slot 38 is adapted to be aligned with slot 20 in lid 16 of housing 14 upon closing lid 16 in housing 14. The slot at the bottom of reader 30 is adapted to be aligned with the slot in ballot box 24.

Reader 30 is adapted to read ballot card 12 in any orientation in which such card 12 may be inserted therein by the voter, face up with the printing right side up or upside down, or back side up with the printing right side up or upside down. Reader 30 includes an internal computer, adapted to take data read therein and set up such data in serial fashion to be transmitted to station computer 32. There are two reading heads in reader 30, each adapted to optically scan one side of card 12 to sense the marks recorded thereon by the voter. Such heads are further adapted to read the front and back of card 12 simultaneously, as card 12 moves through reader 30, reading all of the front and all of the back in one movement of the card.

Reader 30 further includes two sets of rollers (not shown), the first set preceding the read station, to pick up card 12, the second set at the end of card 12 to propel card 12 out of the reader and assure that it passes through the adjacent slot in, and into, ballot box 24. A motor drives all of the rollers in synchronization, to prevent jam-up of the cards. Reader 30 will not read or move a card 12 until station computer 32 indicates that it is ready to receive further data therefrom, such that if an attempt is made to stuff a second card 12 into reader 30 before the station computer has completed counting the first card 12, reader 30 will not run, and will not accept the second card.

Ballot card 12 includes tracking marks, as 40, on both front and back leading edges thereof. These marks 40 are read by reader 30, and the internal computer therein interprets such markings and the location thereof in the stream of data read by the reading heads in reader 30 to determine the orientation of the card. Such internal computer in reader 30 then unscrambles and rearranges the data, to be then fed to station computer 32 for use in counting the votes.

Figure 6:
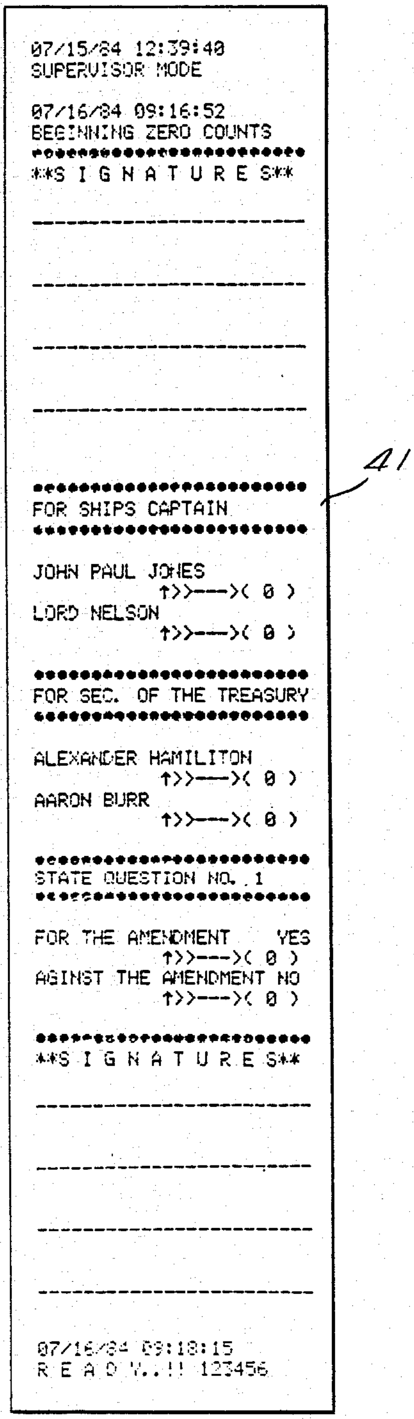
FIG. 6 is a front elevational view of an initializing printout in the precinct ballot-counting device.
Figure 7:
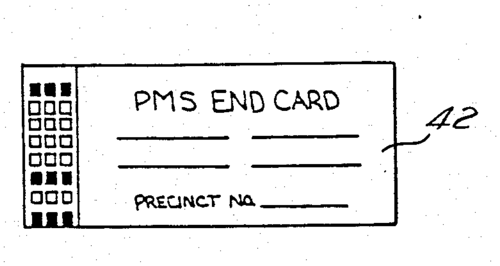
FIG. 7 is a front elevational view of a sample end card for the precinct ballot-counting device.
Figure 8:
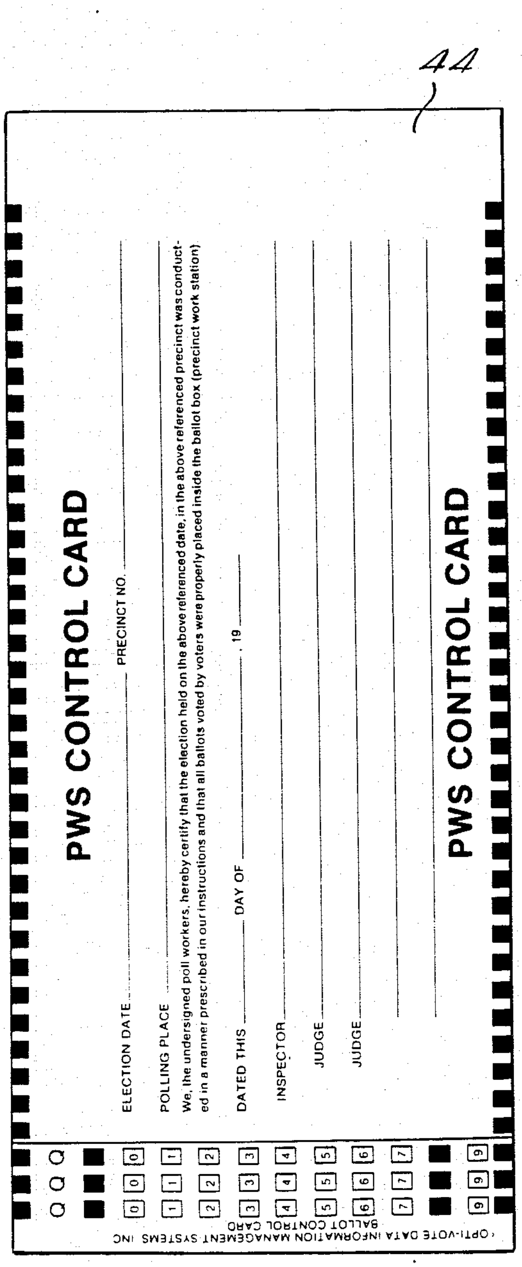
FIG. 8 is a front elevational view of a sample control card for the precinct ballot-counting device.

An initializing printout as 41 in FIG. 6, is processed through station computer 32 to initialize precinct workstation 10. Control cards, as 42 in FIG. 7, comprising an "end" function card, and 44 in FIG. 8, comprising a control card, are inserted into reader 30 at the appropriate points in time with respect to the election. Such initializing printout and control cards enable control of the election thereby, and form part of an audit of the conduct of the election, if required.

Station computer 32 includes a cartridge receiving portion 46, a display screen 48, a line printer 50, and a keyboard 52 as shown in FIGS. 3–4. Cartridge-receiving portion 46 is adapted to receive an EPROM cartridge, programmed by an EPROM programmer under the control of the host central station computer. The host central station computer is programmed with the data for each separate precinct election, and it controls the programming of the individual EPROM cartridges through the EPROM programmer. Each EPROM cartridge is programmed with the specific data, including identification of candidates and issues, necessary for conducting the specific election at each polling place in the elections district. Such data comprises a sequence of instructions regarding the specific election taking place at a particular polling place. It includes two modes of instructions, a supervisory mode for enabling a supervisor to run tests, set up the device for counting, transmit data, obtain audit information, change the dates and times, or the like, and a counting mode for enabling counting of the votes, for each office or issue being voted on in the election. Display screen 48 is adapted conventionally to display alphanumeric information relating to various elections functions. The display thereon may be viewed, with lid 16 closed on housing 14, through window 18 in lid 16.

Line printer 50 is adapted to print election-related information in duplicate on printout paper comprised of a roll of two sheets 54 and 56, one overlying the other, with lid 16 of housing 14 open. The overlying sheet 54 is adapted to be separable upon completion of individual election-related functions. The underlying sheet 56 is adapted to be a continuous sheet on which information regarding all election-related functions is retained as an audit record. Information in the supervisory mode of operation of precinct workstation 10, printed in duplicate on sheets 54 and 56 may, for example, be as shown in FIG. 6. Keyboard 46 is adapted to enable entry of data therethrough in the conventional manner.

Power switch 34 is adapted to turn "on" and "off" an internal d-c battery which provides power to the workstation 10. Such battery further enables the precinct workstation to operate even if the precinct polling place loses a-c power. A monitor in housing 14 monitors the condition of the power source to indicate whether it is critically low.

Connecting cable 36 is adapted to be plugged into the host central station computer to enable transmission of data thereto for aggregating the totals in all precinct stations 10 to deliver the results of the election. It may comprise a cable known as an "RS 232" plug. Data from precinct stations 10 may be transmitted directly from the remote precinct station back to the host central station alternatively by an accoustical modem, enabling transmission of data over normal telephone lines, or a modular modem connectable to a modular telephone jack where available.

The elements in precinct workstation 10, specifically reader 30, station computer 32, and the power source, are all modular, i.e. designed in such a way that if one stops working, it is easily and rapidly replaceable with a new module, enabling the election to continue. Further, workstation 10 is lightweight and relatively compact, enabling it to be readily transported between the central and precinct locations.

The district workstation at the central elections department district office comprises a host programmable computer, which performs a number of functions under the direction of supervisory elections personnel. The host computer, based on elections programming thereof, generates ballots in facsimile format for each individual precinct election. Such data is then fed out of the host to supervisory people to provide them with supporting information regarding information which is supposed to be in each precinct workstation. The host computer further tests the election as a whole, then introduces such data into the EPROM format, controlling the programming of each precinct EPROM cartridge. The EPROM cartridge is then inserted in receiving portion 40 of each precinct workstation computer 32, whereupon the election is retested at the precinct level.

To set up the apparatus for use in an election, the host central station computer is programmed for the offices and/or issues being voted on in each precinct. The host computer is then used, prior to election day, to program and test the election at large, and control the introduction of the election into individual precinct formats programmed in individual precinct EPROM cartridges, adapted for use in each precinct workstation 10, with the offices and/or issues being voted on in each such precinct. Each EPROM cartridge is then placed in a precinct workstation 10, each such device being connected and sealed to a ballot box 24. Each precinct workstation 10 and connected ballot box 24 is then transported to the precinct polling place.

On election day, each precinct workstation 10 is initialized, ballot cards 12 are inserted therein by voters after recording their votes on such cards, and the card 24 are read internally in the device by card reader 30 and the votes for each office and/or issue are counted and stored in station computer 32, and the ballot cards 12 are stored in the sealed ballot box 24. When the election is over, the precinct workstation 10 is shut down, and then transported back to the central station, where the stored vote counts are read and tallied, and the results of the elections are delivered by the central station computer for each office and/or issue voted upon.

The above features of the device enable reading, counting, and storing of votes recorded by voters on ballot cards at a precinct polling place, and storing of the ballot cards on which such votes are recorded, in a secret, secure, efficient and effective manner, without opportunity for disclosure thereof or tampering therewith. Such features further provided programming, testing, formating of the election, and reading and tallying of the stored vote counts at a central station, and delivery of the results of the election in a secure, efficient, and effective manner.

Preferred embodiments of the invention have been set forth above, for the purpose of explaining the invention. However, it is to be understood that variations may be made in such embodiments, which variations are nevertheless within the scope and spirit of the invention, as set forth in the claims herein.

I claim:

1. An apparatus for enabling electronic computerized reading, counting, and storing of votes recorded by voters on ballot cards during an election, at at least one polling place remote from a central station, and for enabling electronic computerized programming and testing of the election at large, controlling of the introduction of the election format into the apparatus in individual precinct formats, reading, aggregating, and tallying of such vote counts, and delivery of the results of the election, at the central station, comprising:

(a) means for enabling electronic computerized reading, counting, and storing, at at least one of the plurality of polling places remote from the central station, of the votes for each office or issue being voted on in the election recorded by voters on ballot cards during the election, adapted to be connected to a standard ballot box such that the ballot cards are stored in the standard ballot box, after reading, counting, and storing of the votes recorded thereon without such ballot cards being exposed to any person; and (b) means for enabling electronic computerized programming and testing of the election at large, controlling of the introduction of the election into individual precinct formats, reading, aggregating, and tallying of such vote counts stored in the vote counting enabling means, and delivery of the results of the election, for each office or issue being voted on in the election, at the central station.

2. An apparatus as in claim 1, in which the vote reading, counting, and storing means comprise means for reading the votes recorded on the ballot cards and generating vote counting data responsive thereto, means for accepting the vote counting data generated by the reading means, applying prescribed vote-counting processes to such data, and storing the results of such vote-counting processes, a power source for providing power for operation of the card reading means and vote-count accepting means, and a housing in which the reading means, vote-count accepting means, and power source are mounted.

3. An apparatus as in claim 1, in which the vote reading, counting, and storing means comprise means for accepting the counted vote data stored in the vote counting enabling means, applying prescribed vote-result delivery processes to such data, and generating an output comprising the delivery of the results of the application of such prescribed vote-result delivery processes.

4. An apparatus as in claim 1, further comprising means for providing a sequence of instructions to the vote reading, counting and storing means regarding a specific election taking place at a particular polling place.

5. An apparatus as in claim 1, further comprising cards processible through the vote reading, counting, and storing means for enabling control of the operation thereof and audit of the conduct of the election at such polling place.

6. An apparatus as in claim 1, further comprising means for enabling transmission of the stored vote counts from the vote reading, counting, and storing means to the vote count reading, aggregating, and tallying means.

7. An apparatus as in claim 1, in which the vote count reading, aggregating, and tallying means are further adapted for high-speed reading of the votes recorded on the ballot cards, for generating vote counting data responsive thereof.

8. An apparatus as in claim 1, in which the standard ballot box, to which the vote reading, counting, and storing means are adapted to be connected, is adapted to be sealed so as to provide visible evidence in the event of unauthorized entry.

9. An apparatus as in claim 2, in which each ballot card includes markings thereon , adapted to be read by the vote reading, counting, and storing means so as to generate ballot data and to enable the ballot data to be configured for processing thereof dependent upon the orientation of the ballot card, to enable processing of the vote count from each such ballot card, regardless of the orientation of the ballot card.

10. An apparatus as in claim 9, further comprising means for enabling connection of the vote reading, counting, and storing means to the standard ballot box.

11. An apparatus as in claim 9, in which the ballot box includes a slot therein adapted to enable the ballot card to pass therethrough into the ballot box, and in which the vote reading, counting, and storing means include aligned slots, adapted to enable the ballot card to be inserted therein and pass therethrough, and further adapted to be aligned with the ballot card slot in the ballot box for enabling the ballot card to pass therethrough.

12. An apparatus as in claim 9, in which the vote reading, counting, and storing means includes means for accepting the ballot card, means for reading the votes on each ballot card, generating ballot data responsive thereto, and configuring the ballot data for processing thereof dependent upon the orientation of the ballot card, means for processing and delivering the ballot data generated by the generating means, and means for moving the ballot card therethrough and into the ballot box after reading thereof.

13. An apparatus as in claim 9, in which the power source further comprises a switch for enabling the power source to be switched "on" and "off", and means for monitoring the power-generating capability of the power source.

14. An apparatus as in claim 9, in which the vote accepting, processing and storing means includes a display, and the housing includes a lid which includes a window therein through which the display may be seen when the lid is closed.

15. An apparatus as in claim 9, in which the ballot card markings are located at one end of the ballot card.

16. An apparatus as in claim 9, in which the ballot card markings are located on both sides of the ballot card.

17. An apparatus as in claim 3, in which the counted vote accepting, processing, and output generating means comprise a programmable computer.

18. An apparatus as in claim 4, in which the vote accpeting, processing, and storing means comprise a programmable computer, including means for enabling reading and storing of the sequence of instructions from the instructions providing means into the computer, and a line printer operable responsive to instructions from the computer program for printing election-related information on paper.

19. An apparatus as in claim 18, in which the instructions providing means comprise an EPROM cartridge, on which is programmed a sequence of instructions regarding the specific election taking place at a particular polling place, including two modes of instructions, a supervisory mode for enabling a supervisor to perform operations including running tests, setting up the device for counting, transmitting data, obtaining audit information, and changing the dates and times, and a counting mode for enabling counting of the votes, for each office or issue being voted on in the election, and means for programming the sequence of instructions on the EPROM cartridge.

20. A device for enabling electronic computerized reading, counting, and storing of votes recorded by voters on ballot cards during an election, at at least one polling place remote from a central station, comprising means for enabling electronic computerized reading, counting, and storing, at at least one of the plurality of polling places remote from the central location, of the votes for each office or issue being voted on in the election recorded by voters on ballot cards during the election, adapted to be connected to a standard ballot box such that the ballot cards are stored in the standard ballot box, after reading, counting, and storing of the votes recorded thereon without such ballot cards being exposed to any person.

21. An apparatus as in claim 20, in which the vote reading, counting, and storing means comprise means for reading the votes recorded on the ballot cards and generating vote counting data responsive thereto, means for accepting the vote counting data generated by the reading means, applying prescribed vote-counting processes to such data, and storing the results of such vote-counting processes, a power source for providing power for operation of the card reading means and vote-count accepting means, and a housing in which the reading means, vote-count accepting means, and power source are mounted.

22. An apparatus as in claim 20, further comprising means for providing a sequence of instructions to the vote reading, counting, and storing means regarding a specific election taking place at a particular polling place.

23. An apparatus as in claim 20, further comprising cards processible through the vote reading, counting, and storing means for enabling control of the operation thereof and audit of the conduct of the election at such polling place.

24. An apparatus as in claim 20, in which the standard ballot box, to which the vote reading, counting, and storing means are adapted to be connected, is adapted to be sealed so as to provide visible evidence in the event of unauthorized entry.

25. An apparatus as in claim 20, in which the ballot box includes a slot therein adapted to enable the ballot card to pass therethrough into the ballot box, and in which the vote reading, counting, and storing means include aligned slots, adapted to enable the ballot card to be inserted therein and pass therethrough, and further adapted to be aligned with the ballot card slot in the ballot box for enabling the ballot card to pass therethrough.

26. An apparatus as in claim 21, in which the vote reading, counting, and storing means includes means for accepting the ballot card , means for reading the votes on each ballot card, generating ballot data responsive thereto, and configuring the ballot data for processing thereof dependent upon the orientation of the ballot and, means for processing and delivering the ballot data generated by the generating means, and means for moving the ballot card therethrough and into the ballot box after reading thereof.

27. An apparatus as in claim 21, in which each ballot card includes markings thereon, adapted to be read by the vote reading, counting, and storing means so as to generate ballot data and to enable the ballot data to be configured for processing thereof dependent upon the orientation of the ballot card, to enable processing of the vote count from each such ballot card, regardless of the orientation of the ballot card.

28. An apparatus as in claim 27, further comprising means for enabling connection of the vote reading, counting, and storing means to the standard ballot box.

29. An apparatus as in claim 27, in which the power source further comprises a switch for enabling the power source to be switched "on" and "off", and means for monitoring the power-generating capability of the power source.

30. An apparatus as in claim 27, in which the vote accepting, processing and storing means includes a display, and the housing includes a lid which includes a window therein through which the display may be seen when the lid is closed.

31. An apparatus as in claim 27, in which the ballot card markings are located at one end of the ballot card.

32. An apparatus as in claim 27, in which the ballot card markings are located on both sides of the ballot card.

33. An apparatus as in claim 22, in which the vote accepting, processing, and storing means comprise a programmable computer, including means for enabling reading and storing of the sequence of instructions from the instructions providing means into the computer, and a line printer operable responsive to instructions from the computer program for printing election-related information on paper.

34. An apparatus as in claim 33, in which the instructions providing means comprise an EPROM cartridge, on which is programmed a sequence of instructions regarding the specific election taking place at a particular polling place, including two modes of instructions, a supervisory mode for enabling a supervisor to perform operations including running tests, setting up the device for counting, transmitting data, obtaining audit information, and changing the dates and times, and a counting mode for enabling counting of the votes, for each office or issue being voted on in the election, and means for programming the sequence of instructions on the EPROM cartridge.

* * * * *